United States Patent [19]

Frieser et al.

[11] Patent Number: 4,790,951

[45] Date of Patent: Dec. 13, 1988

[54] LIQUID ALL-PURPOSE CLEANING PREPARATIONS CONTAINING TERPENE AND HYDROGENATED NAPHTHALENE AS FAT DISSOLVING AGENT

[75] Inventors: Erich P. Frieser; Alexander Jainschig, Vienna, Austria

[73] Assignee: Henkel Kommanditgesellschaft auf Aktien, Duesseldorf, Fed. Rep. of Germany

[21] Appl. No.: 61,939

[22] Filed: Jun. 12, 1987

[30] Foreign Application Priority Data

Jun. 12, 1986 [AT] Austria ................................ 1601/86

[51] Int. Cl.[4] ................................................ C09D 9/00

[52] U.S. Cl. .................................... 252/162; 252/170; 252/DIG. 14

[58] Field of Search ................ 252/162, DIG. 14, 170

[56] References Cited

U.S. PATENT DOCUMENTS

| | | | |
|---|---|---|---|
| 1,843,316 | 2/1932 | Daimler | 252/158 |
| 4,125,476 | 11/1978 | Dean | 252/115 |
| 4,414,128 | 11/1983 | Goffinet | 252/111 |
| 4,597,887 | 7/1986 | Colodney | 252/106 |
| 4,612,141 | 9/1986 | Faurote, Jr. | 252/546 |
| 4,614,236 | 9/1986 | Watkins | 166/304 |

FOREIGN PATENT DOCUMENTS

| | | |
|---|---|---|
| 80749 | 6/1983 | European Pat. Off. . |
| 106266 | 4/1984 | European Pat. Off. . |
| 40882 | 1/1985 | European Pat. Off. . |
| 137616 | 4/1985 | European Pat. Off. . |
| 535335 | 9/1931 | Fed. Rep. of Germany . |
| 34996 | 1/1965 | German Democratic Rep. . |
| 160446 | 5/1933 | Switzerland . |
| 1145027 | 3/1985 | Switzerland . |

OTHER PUBLICATIONS

Ullmann, "Encyklopädie der technischen Chemie", vol. 16, 3rd ed. (1965), p. 777.

E. Kiewert, *Seifen, Öle, Feete Wachse* 107 (1981), pp. 35–40.

The Condensed Chemical Dictionary, 7th Edition, Reinhold Publ., p. 649, The Merck Index, 10th Edition, pp. 888 and 1033.

*Primary Examiner*—John F. Niebling

*Assistant Examiner*—Isabelle Rodriguez

*Attorney, Agent, or Firm*—Ernest G. Szoke; Henry E. Millson, Jr.; Wayne C. Jaeschke

[57] ABSTRACT

Liquid all-purpose preparations of the type containing anionic and/or nonionic surfactants, water soluble builders, and water-soluble solvents are significantly improved by the inclusion of a fat-dissolving agent consisting essentially of a terpene and a solvent based on completely or partially hydrogenated naphthalene.

25 Claims, No Drawings

LIQUID ALL-PURPOSE CLEANING PREPARATIONS CONTAINING TERPENE AND HYDROGENATED NAPHTHALENE AS FAT DISSOLVING AGENT

BACKGROUND OF THE INVENTION

1. Field of the Invention

The surfaces of plastics, glass, ceramics, and fine steel present both in the home and in the work place are now cleaned almost exclusively with liquid cleaning preparations. However, conventional liquid all-purpose cleaning preparations tend to be limited in their fat- and soil-dissolving effect because, in general, only limited quantities of surfactants and complexing agents can be incorporated without risking product stability. Excessive levels of these fat- and soil-dissolving agents lead not only to products unstable in storage, but also to the occurrence of product residues in the form of streaks and specks on the surfaces thus cleaned.

2. Discussion of Related Art

In order to promote solubilization of fatty soil, while maintaining product stability, it is thus standard practice to include water-miscible solvents such as monohydric and polyhydric alcohols, glycols, glycol ethers and glycol ether acetates in conventional liquid cleaning preparations. These water-miscible solvents act on the one hand as solution promoters for surfactants present in the cleaning preparations, and, on the other hand, also themselves provide advantages in the cleaning of fat- and oil-soiled surfaces.

The incorporation of fat-dissolving and odor-generating terpenes in liquid all-purpose cleaning preparations for these purposes is also known. For example, European patent application EP No. 80,749 describes liquid cleaning preparations containing surfactants, water-soluble builders, water-soluble solvents, terpenes, and also 2-(2-butoxyethanol)-ethanol. Combinations of surfactants, water-soluble builders and water-soluble solvents with mono- or sesquiterpenes and polar solvents having a solubility in water of from 0.2 to 10% by weight, preferably benzyl alcohol, are the subject of European patent application EPO No. 106,266 and European patent EP No. 40,882.

European patent application EP No. 137,616 describes a conventionally-formulated liquid cleaning preparation which contains at least 5% of a fat-removing solvent and from 5 to 50% of a fatty acid or soap comprising a stable oil-in-water microemulsion having a pH value of 6.5 or higher. The fat-removing solvent comprises a mixture of an apolar solvent (terpenes, iso-$C_{10}$–$C_{12}$-paraffin oils, $C_6$–$C_9$-alkylbenzenes or liquid olefins) and a polar solvent (benzyl alcohol, diethylphthalate, dibutylphthalate or 2-(2-butoxyethanol)-ethanol. Cycloalkanes (cyclohexane and naphtha) are also mentioned as solvents.

Swiss Pat. No. 160,446 relates to a process for the production of a cleaning paste which dissolves and absorbs soil and fat comprising an emulsion containing carbon tetrachloride, decalin, hexalin, olive oil and water admixed with a suspension of rice starch in water to form a white emulsion; sodium hydroxide and water are then added in a quantity sufficient to obtain a white paste containing no more than 0.5% free alkali after saponification of the olive oil.

A preparation for dissolving and dispersing solidified deposits of combustion residues on machines or machine components, particularly internal combustion engines, is described in East German Pat. No. 34,996. The preparation comprises an emulsifiable liquid mixture containing in all from 12 to 23 parts by weight of a mixture of ammonium and calcium alkylbenzene sulfonates, from 50 to 70 parts by weight of hydrogenated naphthalenes, and from 10 to 20 parts by weight of technical pyridine bases.

SU patent No. 1 145 027 relates essentially to a bar of soap containing from 90 to 95 parts by weight of soap, from 0.5 to 1 part by weight of polyacrylamide, from 1.5 to 3 parts by weight of decalin and from 3 to 6 parts by weight of gall.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that combinations of surfactants, water-soluble builders, water-miscible solvents, and terpenes with certain apolar, water-insoluble solvents in liquid cleaning preparations have unexpectedly improved cleaning effects, particularly on oil and fatty soils.

Accordingly, the present invention relates to liquid all-purpose cleaning preparations containing anionic and/or nonionic surfactants, water-soluble builders, water-miscible solvents, and a fat-dissolving agent comprising at least one terpene in combination with an apolar, water-insoluble solvent selected of the group of completely or partially hydrogenated naphthalene.

The liquid all-purpose cleaning preparations according to the invention have the following composition:

- from 1 to 25%, and preferably from 3 to 10%, by weight of anionic and/or nonionic surfactant;
- from 0.1 to 10%, and preferably from 0.5 to 5%, by weight of water-soluble builder;
- from 1 to 15%, and preferably from 5 to 10%, by weight of water-miscible solvent;
- from 0.25 to 5.0%, and preferably from 0.5 to 2.5%, by weight of an apolar, water-insoluble solvent selected of the group of completely or partially hydrogenated naphthalene; and
- from 0.25 to 5.0% and preferably from 0.5 to 2.5%, by weight of terpene; wherein
- the total quantity of the fat-dissolving agent comprising said combination of terpene with apolar, water-insoluble solvent is from 0.5 to 10%, and preferably from 1.0 to 5%, by weight, based on the total weight of the cleaning preparation.

In addition, alkaline constituents are optionally added to adjust the pH of the liquid cleaning preparations to pH values above 7, and preferably to pH values of from 8 to 10.

Suitable anionic surfactants include linear alkylbenzene sulfonates, alkane sulfonates, olefin sulfonates, alkyl sulfates, α-sulfofatty acid methyl esters, fatty alcohol ether sulfates and fatty acids normally used for this purpose in known cleaning preparations in the form of their alkali or amine salts.

Useful nonionic surfactants include ethoxylated alcohols, acids and amines containing $C_{10}$–$C_{18}$-carbon chains and from 4 to 20 moles ethylene oxide in the molecule, and amine oxides, such as dimethyl alkylamine oxides and bis-(hydroxyethyl)-alkylamine oxides.

Broadly, non-ionic and anionic surfactants of the type well-known in the art are contemplated.

Suitable water-soluble builders are those commonly employed as detergent builders such as inorganic or organic complexing agents, especially those from the following groups: tri- or pyrophosphates; organophosphonic acids, for example aminotrimethylene phosphonic acid, hexamethylene-diamine tetramethylene phosphonic acid, hydroxyethane diphosphonic acid; aminopolycarboxylic acids, such as nitrilotriacetic acid or ethylenediamine tetra-acetic acid; polycarboxylic acids, such as for example copolymers of maleic acid anhydride with acrylic acid, with olefins, or methyl vinyl ether; polyacrylic acids; polyaldehydocarboxylic acids; and monomeric carboxy acids, such as citric acid and gluconic acid. All these complexing agents are generally used in the form of their alkali salts.

The water-miscible solvents employable in the present invention are also those well known in this art and preferably are selected from alcohols including aliphatic $C_2$–$C_3$-alcohols, glycols, and glycol ethers, although they may also be solution-promoting compounds, such as in particular urea, or hydrotropes, such as alkylbenzene sulfonates containing $C_1$–$C_3$-alkyl chains.

Caustic alkali, caustic soda, alkali carbonates, ammonia, and similar alkalizers are suitable for adjusting the pH value. Mono-, di-, or triethanolamine is preferably added for reasons of stability. Generally, adjustment of a pH value above 7 is of advantage to obtain a more strongly negative charging of soil and substrate and, hence, to obtain a greater electrostatic repulsion.

Suitable terpenes useful according to the invention comprise terpene hydrocarbons, preferably monocyclic and bicyclic monoterpenes. Useful monocyclic monoterpenes include α- and β-terpenes, D-limonene and L-limonene, and dipentene, while suitable bicyclic monoterpenes are α- and β-pinene. Mixtures of monocyclic and bicyclic terpene hydrocarbons, and also mixtures of terpenes and terpene alcohols such as the so-called pine oils [i.e., mixtures inter alia of terpenes with 60 to 80% α- and β-terpineols (cf. Ullmann "Encyclopädie der technischen Chemie", Vol. 16, 3rd Edition (1965), page 777)]also produce the improved results obtained according to the invention in combination with the water-insoluble apolar solvents of the invention.

The water-insoluble apolar solvents are selected of the group of completely or partially hydrogenated naphthalene. Preferably, from a commercial standpoint, decahydronaphthalene and tetrahydronaphthalene are employed; however, hexahydronaphthalene and octahydronaphthalene are also effective. Non-interfering substituents may be present on the naphthalene nucleus.

The unexpectedly improved detergent effect attributable to the combination of water-insoluble naphthalenic hydrocarbons and terpenes is demonstrated in the following Examples.

EXAMPLES

White PVC film was coated with black shoe cream and 6 ml of the test cleaner distributed over the wiper with a plastic sponge (cf. E. Kiewert, Seifen, Öle, Fett, Wachse 107 (1981) 35). After 10 wipes, i.e. the actual cleaning process, the PVC film was rinsed under running water and dried in air. The whiteness of the PVC film was then determined (R=remission value, as measured with a Dr. Lange LF 90 colorimeter).

EXAMPLE 1

Product I 7.0% linear $C_9$–$C_{13}$-alkylbenzene sulfonate, Na salt pl 1.0% adduct of 10 moles ethylene oxide with 1 mole $C_{16}$–$C_{18}$ fatty alcohol 0.4% aminotrimethylene phosphonic acid, Na salt 6.0% isopropanol balance: water to 100%, pH value 10, adjusted with triethanolamine.

| | R-value |
|---|---|
| Product I | 21.1 |
| Product I + 2% pine oil | 24.4 |
| Product I + 1% decahydronaphthalene (DHN) | 22.5 |
| Product I + 2% DHN | 34.5 |
| Product I + 1% DHN + 1% pine oil | 54.1 |
| Product I + 1.5% DHN + 0.5% pine oil | 51.7 |
| Product I + 0.5% DHN + 1.5% pine oil | 50.3 |

The synergism of the combination added in accordance with the invention is clearly apparent.

EXAMPLE 2

Product II 4.0% Na $C_{14}$–$C_{17}$ alkane sulfonate, Na salt 2.0% adduct of 7 moles ethylene oxide with 1 mole $C_{13}$–$C_{15}$ oxoalcohol 1.0% Na soap from lauric acid ($C_{12}$=93%) pl 3.0% Na citrate 3.0% Na carbonate 1.5% Na cumene sulfonate balance: water to 100%

On this occasion, the PVC film was soiled with black mascara instead of shoe cream:

| | R-value |
|---|---|
| Product II | 25.0 |
| Product II + 2% decahydronaphthalene (DHN) | 51.1 |
| Product II + 2% pine oil | 50.5 |
| Product II + 1% DHN + 1% pine oil | 67.5 |
| Product II + 2% mixture of predominantly monocyclic terpene hydrocarbons Bp. 170–190° C.; D 20° C.: 0.85–0.88 | 59.0 |
| Product II + 2% tetrahydronaphthalene (THN) | 62.3 |
| Product II + 1% mixture of predominantly monocyclic terpene hydrocarbons, Bp. 170–190° C. D 20° C.: 0.85–0.88 + 1% THN | 69.9 |
| Product II + 2% limonene | 55.1 |
| Product II + 1% limonene + 1% DHN | 70.3 |

EXAMPLE 3

Product III 5.0% linear $C_9$–$C_{13}$ alkylbenzene sulfonate, Na salt 2.0% adduct of 7 moles ethylene oxide with 1 mole $C_{13}$–$C_{15}$ oxoalcohol 2.0% K pyrophosphate 8.0% isopropanol balance: water

| | R-value (shoe cream) |
|---|---|
| Product III | 25.9 |
| Product III + 1% DHN | 39.7 |
| Product III + 1% α-pinene | 40.1 |
| Product III + 0.5% DHN | |

-continued

| | R-value (shoe cream) |
|---|---|
| Product III + 0.5% α-pinene | 49.9 |

Even when directly applied to soiled surfaces in undiluted form, the cleaning preparations according to the invention show advantages in terms of the cleaning effect.

EXAMPLE 4

The cleaning effect of the cleaning preparations according to the invention is also more favorable than that of the formulations described in EP No. 106,266. In this case, Example 3 of EP No. 106,266 was compared with the cleaning effect of a formulation according to the invention:

| | Example 3 of EP 106,266 (figures in % by weight) | Example according to the invention (= product IVa) |
|---|---|---|
| $C_9$-$C_{13}$—alkylbenzene sulfonate, Na salt | 4.0 | 4.0 |
| Sodium carbonate | 2.5 | 2.5 |
| Nitrilotriacetic acid, Na salt | 3.0 | 3.0 |
| Dipentene | 2.0 | 2.0 |
| Benzyl alcohol | 2.0 | — |
| DHN | — | 2.0 |
| Cumene sulfonate, Na salt | 2.0 | 2.0 |
| Balance: water to 100% | | |

In addition, Example 21 of EP No. 106,266 was compared in slightly modified form with the solvent combination according to the invention.

| | Example 21 of EP 106,266 (figures in % by weight) | Example according to the invention (= product IVb) |
|---|---|---|
| $C_{14}$-$C_{17}$—alkane sulfonate, Na salt | 4.5 | 4.5 |
| Na citrate.$2H_2O$ | 3.5 | 3.5 |
| Sodium carbonate | 3.0 | 3.0 |
| Pine oil | 2.0 | 2.0 |
| Phenylethyl alcohol* | 1.5 | — |
| Na—o-phenylphenol | 1.4 | 1.4 |
| Cumene sulfonate, Na salt | 1.4 | 1.4 |
| DHN | — | 1.5 |
| Balance: water to 100% | | |

*instead of benzyl alcohol (EP 106,266)

The cleaning effect was tested as described above on white PVC film soiled with black shoe cream or black mascara, followed by measurement of the degree of whiteness (R-value).

| | Soil (R-values) | | |
|---|---|---|---|
| | Mascara | Shoe cream | Carbon black/ wool grease, fat |
| Product of Example 3 of EP 106,266 | 55*1 | 51*1 | 56*2 |
| Product IVa | 65*1 | 60*1 | 72*2 |
| Product of Example 21 of EP 106,266 | 66*2 | 64*2 | — |
| Product IVb | 74*2 | 78*2 | — |

*1diluted 1:2 with tapwater (11° Gh)
*2undiluted

A particularly outstanding feature of the cleaning preparation according to the invention is the absence of residues on the cleaned surfaces so that there is no need for rewiping.

We claim:

1. In a liquid cleaning preparation for removing fats and soil from hard surfaces of the type containing an anionic or nonionic surfactant or both; a water-soluble builder; and a water-miscible solvent; the improvement comprising a fat-dissolving agent consisting essentially of from about 0.25 to about 5.0% by weight of a terpene and from about 0.25 to about 5.0% by weight of a water-insoluble apolar solvent which is completely or partially hydrogenated naphthalene, and wherein the pH of the cleaning preparation is above about 7.

2. The liquid cleaning preparation of claim 1, wherein the apolar water-insoluble solvent is decahydronaphthalene or tetrahydronaphthalene.

3. The liquid cleaning preparation of claim 1, containing from about 0.5 to 2.5% by weight of the apolar water-insoluble solvent.

4. The liquid cleaning preparation of claim 1, wherein the total quantity of fat-dissolving agent is from about 1.5 to 5% by weight of the total preparation.

5. The liquid cleaning preparation of claim 1, wherein the pH is from about 8 to 10.

6. The liquid cleaning preparation of claim 1, wherein the terpene is a monocyclic or bicyclic monoterpene.

7. The liquid cleaning preparation of claim 6, wherein the terpene is an α- or β-terpene.

8. The liquid cleaning preparation of claim 6, wherein the terpene is D-limonene, L-limonene, dipentene, or α- or β-pinene.

9. The liquid cleaning preparation of claim 1, wherein the terpene is a pine oil.

10. The liquid cleaning preparation of claim 6, wherein the naphthalene is decahydro- or tetrahydronaphthalene.

11. The liquid cleaning preparation of claim 2, containing from about 0.25 to 5.0% by weight of the apolar water-insoluble solvent.

12. The liquid cleaning preparation of claim 2, containing from about 0.5 to 2.5% by weight of the apolar water-insoluble solvent.

13. The liquid cleaning preparation of claim 2, wherein the total quantity of the terpene and apolar water-insoluble solvent fat-dissolving agent is from about 0.5 to 10% by weight of the total preparation.

14. The liquid cleaning preparation of claim 2, wherein the total quantity of fat-dissolving agent is from about 1.5 to 5% by weight of the total preparation.

15. The liquid cleaning preparation of claim 2, wherein the pH value is above about 7.

16. The liquid cleaning preparation of claim 2, wherein the pH is from about 8 to 10.

17. The liquid cleaning preparation of claim 2, wherein the terpene is a monocyclic or bicyclic monoterpene.

18. The liquid cleaning preparation of claim 2, wherein the terpene is an $\alpha$- or $\beta$-terpene.

19. The liquid cleaning preparation of claim 2, wherein the terpene is D-limonene, L-limonene, dipentene or $\alpha$- or $\beta$-pinene.

20. The liquid cleaning preparation of claim 2, wherein the terpene is a pine oil.

21. A liquid cleaning preparation for removing fats and soil from hard surfaces comprising:

A. from about 1 to about 25% by weight of an anionic surfactant, a nonionic surfactant, or both of the foregoing;

B. from about 0.1 to about 10% by weight of a water-soluble builder,

C. from about 1 to about 15% by weight of a water-miscible solvent;

D. from about 0.25 to about 5.0% by weight of a water-insoluble apolar solvent which is completely or partially hydrogenated naphthalene; and E. from about 0.25 to about 5.0% by weight of a terpene;

wherein the percentages by weight are based on the weight of the liquid cleaning preparation.

22. The liquid cleaning preparation of claim 21 wherein:

component A is present in from about 3 to about 10% by weight;

component B is present in from about 0.5 to about 5% by weight;

Component C is present in from about 5 to about 10% by weight;

Component D is present in from about 0.5 to about 2.5% by weight; and component E is present in from about 0.5 to about 2.5% by weight.

23. The liquid cleaning preparation of claim 21 wherein the pH thereof is above about 7.

24. The liquid cleaning preparation of claim 23 wherein the pH thereof is from about 8 to about 10.

25. The liquid cleaning preparation of claim 21 wherein:

component A is one or more of a linear alkylbenzene sulfonate, an alkane sulfonate, an olefin sulfonate, an alkyl sulfate, a $\alpha$-sulfofatty acid methyl ester, a fatty alcohol ether sulfate, a fatty acid in the form of its alkali metal or amine salt, an ethoxylated alcohol, acid or amine containing a $C_{10}$–$C_{18}$-carbon chain and from 4 to 20 moles ethylene oxide, or an amine oxide;

component B is one or more of a tri- or pyrophosphate, an organophosphonic acid, an aminopolycarboxylic acid, a polycarboxylic acid, a polyacrylic acid, a polyaldehydocarboxylic acid, citric acid, or gluconic acid; and component C is one or more of an alcohol, glycol, a glycol ether, urea, or a $C_1$–$C_3$ alkylbenzene sulfonate.

* * * * *